S. R. WHITE.
HEAT DISTRIBUTING SYSTEM.
APPLICATION FILED JAN. 14, 1907.
1,094,040.
Patented Apr. 21, 1914.
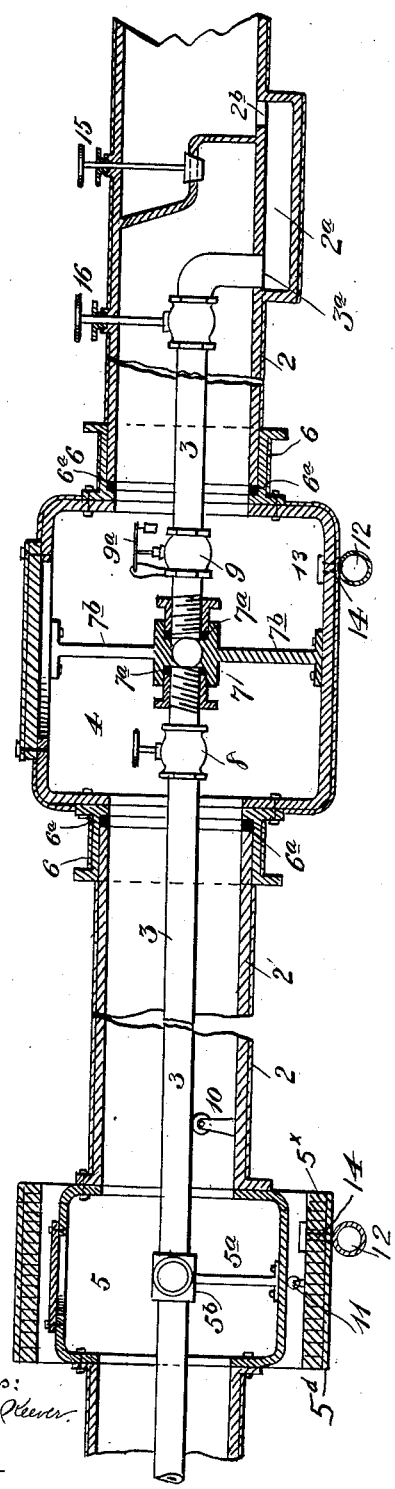
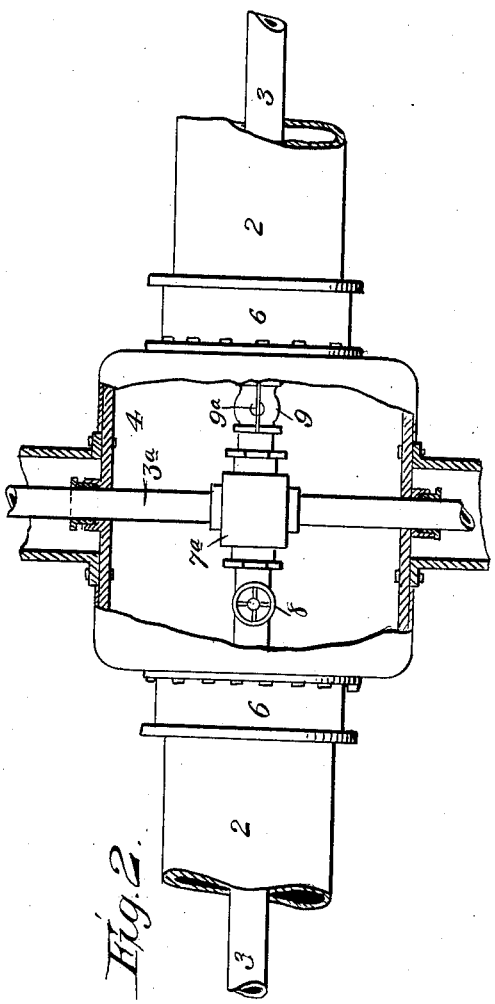
Witnesses:
Inventor:
Samuel R. White
By
Attorneys

UNITED STATES PATENT OFFICE.

SAMUEL R. WHITE, OF BLOOMINGTON, ILLINOIS.

HEAT-DISTRIBUTING SYSTEM.

1,094,040. Specification of Letters Patent. Patented Apr. 21, 1914.

Application filed January 14, 1907. Serial No. 352,284.

*To all whom it may concern:*

Be it known that I, SAMUEL R. WHITE, a citizen of the United States, residing at Bloomington, in the county of McLean and State of Illinois, have invented certain new and useful Improvements in Heat-Distributing Systems, of which the following is a specification.

My invention pertains to improvements in heat-distributing systems.

It has for its object, among other things, to supply heat, more particularly from steam, preferably exhaust-steam, to large districts of dwellings and other buildings in cities, towns and villages, also power for driving machinery or for other purposes; and whereby there shall practically be no waste or loss attending the distributing or supplying of the heating medium; and to carry out these ends in a simple, economic and effective manner.

Said invention consists of certain features substantially as hereinafter fully disclosed and shown by the accompanying drawings wherein—

Figure 1 is a vertical section of the invention in fragmentary form, disclosing the salient features thereof. Fig. 2 is a horizontal section produced through a "sub-station."

In carrying out my invention, I suitably connect with steam-generating plant 1, a pipe or main 2, also a pipe 3 of smaller diameter contained or arranged within the aforesaid pipe or main, the first named pipe or main receiving and conducting exhaust-steam. The main 2, with the inclosed pipe 3, branches off and extends along certain streets or thoroughfares, being placed underground, as usually practised in placing pipes or mains in streets, which branches are again duplicated or branched off along other streets, convenient for making pipe connection therewith for the intervening and outlying districts as will be readily appreciated. Along the routes or lines of the branches of the mains or pipes, are arranged or placed at suitable points or intervals, what may be termed "sub-stations" 4, preferably of metal, in cylindric or drum form and constituting practically "man-holes," being adapted to permit entrance thereto for convenient access to the parts presently noted for manipulation. Also similarly placed intermediately of the steam-generating plant and said "sub-stations" are what may be designated "anchor" stations 5 of suitable construction as presently described, adapted to provide for suitably equipping or supporting therein, as also later set forth, the live-steam inner pipe 3, which "anchor stations" are readily accessible by an attendant for examining or manipulating contained parts as will be noted further along. Connection is effected between the exhaust-steam conducting main or pipe-sections 2 and said "sub-stations" 4 preferably by what may be styled stuffing boxes 6 fitted with suitable steam-tight fitting packing 6ª, and which arrangement is effected to permit of the requisite movement of said pipe-sections due to the usual expansion and contraction action to which the latter are subjected from varying temperatures attending the conducting or passing of steam therethrough. The inner live-steam pipe-sections 3 are suitably spaced apart and equipped within said "sub-stations," with a pipe-coupling or "union" 7 suitably braced in position as at 7ᵇ and fitted with steam-tight packed stuffing boxes 7ª, to provide for the requisite movement of said pipe-sections therein as above described in connection with the exhaust-steam pipe-sections, the primary object of such pipe-coupling or "union" being well understood in this relation. Said live-steam pipe-sections are provided, on one side of said coupling or "union," with a manually actuated valve 8 for regulating or controlling the flow of the live-steam therethrough, while the other pipe-section is equipped upon the opposite side of said coupling with an automatically actuated valve 9. Said valve 9 is suitably controlled in its action by the predetermined pressure of an adjustably weighted lever 9ª exerting downward-pressure upon the stem of said valve, holding the latter closed under normal conditions. Said valve is thus adapted or permitted to open when the exhaust-steam pressure, and accordingly the temperature, in the pipe or main 2 becomes reduced below that of the live-steam pressure in the pipe 3, consequently live-steam, or higher-pressure steam, will be thereby delivered into the pipe 2 and be caused to commingle with and raise the temperature or pressure of the exhaust steam for maintaining the latter at a uniform temperature or pressure throughout the exhaust-steam pipe or main for proper delivery through the service-pipes to the dwellings or patrons, which of course is the desideratum aimed at for the purposes of systems of this character.

The "sub-stations" have the outer surfaces of their cylinders or casings suitably insulated; the corresponding surfaces of the "anchor-stations" being similarly treated as clearly shown in the drawings, for obvious reasons.

In order to relieve the joints, between the pipe and main sections from undue strain and liability of pulling apart, the same have arranged thereunder and in contact therewith anti-frictional rolls 10 and 11 respectively, suitably carried or supported in position preferably as shown, within the main or pipe, and the surrounding insulation of the latter respectively.

Within the "anchor-stations" 5, the live-steam pipe 3, in addition to being braced in position therein as aforesaid, has its sections suitably coupled together by a four-armed "union" or pipe-joint 5$^b$ for connecting therewith cross-street pipe-sections 5$^c$ as members or parts of the heat conducting or supplying system as will be readily understood. Said anchor-station cylindric formation of insulation 5$^x$ may be, and is suitably treated to a coating of tarred paper 5$^d$ for protection from moisture, &c.

Underneath the sundry pipes or mains of the system are arranged or laid drain-tiles 12 for carrying off the water of condensation and other drainage, said condensation-water being suitably trapped off thereinto from the "sub-stations" preferably by a suitable form of valve, as at 13, and from the "anchor-stations" by a drain-passage 14.

As a convenient means of supplying steam-pressure, inside of a dwelling or building, or other location, along the pipe-line as, for instance, for motive-power for driving machinery or other purposes desired, the terminal of any service-pipe or main is equipped with a manually actuated valve 15, while the live-steam pipe 3, which has also a manually actuated valve 16, the purpose of which is apparent, is deflected or bent laterally as at 3$^a$, the lateral deflection delivering into a by-pass 2$^a$ of the pipe or main 2, effecting communication with the primary passage or interior of said pipe or main, as at 2$^b$, beyond the valve 15 as clearly disclosed by Fig. 2, at the right-hand.

In moderate or mild weather, the exhaust-steam supply through the main 2 would probably meet all necessary conditions for heating purposes, without being reinforced by additional heat or live-steam, but it would not be sufficient or adequate in severe weather or usual winter temperatures. In order therefore to provide for this latter condition, the reinforcing or raising of the temperature of the exhaust-steam supply may be effected, as will have been noted from the foregoing, by accordingly opening the valve 8 at any or all the "sub-stations," as circumstances may demand, when live-steam from the pipe 3 will be automatically delivered through the valve 9 into the exhaust-steam in the main 2, effecting the desired result as above pointed out. It is also observed that any radiation of the heat from the inner live-steam feeding or supplying pipe will be transferred to, and utilized in raising the temperature of the exhaust-steam supply from the initial point of supply of the steam-generating plant to the extent of such exhaust-steam supply along the line, even when it may not be required to reinforce the latter as when the valve 8 is opened. It is further remarked that, in devising my heating system, only various or sundry well known contrivances or parts, as employed in this and other branches of the art, are used in practising the same by me, as will have been noted from the above disclosure.

I claim—

In a heat distributing system, the combination with a main exhaust pipe and a live steam pipe located within the exhaust pipe, automatic means for controlling the supply of live steam from the live steam pipe to the main exhaust pipe, a cut-off valve positioned at a given point in the main exhaust pipe, said live steam pipe terminating at a point adjacent the supply side of the cut-off valve and having a valve controlled communication around said cut-off valve with said exhaust steam pipe, whereby either live or exhaust steam or a mixture of both may be supplied to the main pipe beyond the cut-off valve.

In testimony whereof I affix my signature, in presence of two witnesses.

SAMUEL R. WHITE.

Witnesses:
E. L. CASEY,
M. J. READ.